United States Patent
Brown

(10) Patent No.: US 8,776,778 B1
(45) Date of Patent: Jul. 15, 2014

(54) TAILGATE BARBEQUE GRILL

(76) Inventor: Mario Brown, Portsmouth, VA (US)

(*) Notice: Subject to any disclaimer, the term of this patent is extended or adjusted under 35 U.S.C. 154(b) by 984 days.

(21) Appl. No.: 12/630,692

(22) Filed: Dec. 3, 2009

(51) Int. Cl.
*B60R 7/00* (2006.01)

(52) U.S. Cl.
USPC ............... 126/276; 126/29; 126/56; 296/22; 296/26.05; 296/26.06; 296/26.07; 224/403; 224/404; 224/405

(58) Field of Classification Search
USPC ............... 126/276, 29, 56; 296/26.05, 26.06, 296/26.07; 190/15.1
See application file for complete search history.

(56) References Cited

U.S. PATENT DOCUMENTS

| | | | |
|---|---|---|---|
| 2,867,471 A | 1/1959 | Coon, Jr. | |
| 3,826,529 A * | 7/1974 | Wood | 296/37.6 |
| 4,058,228 A * | 11/1977 | Hall | 414/549 |
| 4,347,830 A | 9/1982 | Runyan | |
| 4,518,189 A | 5/1985 | Belt | |
| 4,611,848 A * | 9/1986 | Romano | 296/98 |
| 4,635,992 A * | 1/1987 | Hamilton et al. | 296/37.6 |
| 4,672,944 A | 6/1987 | Curry | |
| 4,673,328 A * | 6/1987 | Shiels | 414/471 |
| 4,677,964 A * | 7/1987 | Lohmeyer et al. | 126/41 R |
| 4,958,979 A * | 9/1990 | Svensson | 414/549 |
| 5,037,153 A * | 8/1991 | Stark | 296/37.6 |
| 5,088,636 A * | 2/1992 | Barajas | 224/281 |
| 5,121,959 A * | 6/1992 | King | 296/37.6 |
| 5,556,249 A * | 9/1996 | Heine | 414/500 |
| 5,626,126 A | 5/1997 | McNulty | |
| 5,640,949 A | 6/1997 | Smith | |
| 5,755,154 A * | 5/1998 | Schroeter et al. | 99/401 |
| 5,897,154 A * | 4/1999 | Albertini et al. | 296/37.6 |
| 5,934,725 A * | 8/1999 | Bowers | 296/26.09 |
| 5,964,492 A * | 10/1999 | Lyon | 296/37.6 |
| 5,975,830 A * | 11/1999 | Goodrich et al. | 414/541 |
| 5,988,722 A * | 11/1999 | Parri | 296/26.09 |
| 6,015,177 A * | 1/2000 | Tijerina | 296/37.6 |
| 6,019,567 A * | 2/2000 | Lutkus et al. | 414/549 |
| 6,077,024 A * | 6/2000 | Trueblood | 414/462 |
| 6,099,232 A * | 8/2000 | Dixon et al. | 414/494 |
| 6,116,673 A * | 9/2000 | Clonan | 296/37.6 |
| 6,354,286 B1 | 3/2002 | Davis | |
| 6,354,647 B1 * | 3/2002 | Voves | 296/37.6 |
| D460,656 S * | 7/2002 | Caulder | D7/332 |
| 6,412,847 B2 * | 7/2002 | De Gaillard | 296/26.02 |
| 6,422,567 B1 * | 7/2002 | Mastrangelo et al. | 296/37.1 |
| 6,460,744 B2 | 10/2002 | Lance et al. | |
| 6,464,277 B2 * | 10/2002 | Wilding | 296/37.6 |
| 6,557,547 B1 * | 5/2003 | MacIntosh | 126/41 R |
| 6,561,746 B1 * | 5/2003 | Broussard et al. | 414/500 |
| 6,575,155 B2 | 6/2003 | Brennan | |
| 6,607,230 B2 * | 8/2003 | Voves | 296/37.6 |
| 6,637,426 B2 * | 10/2003 | Champlin | 126/41 R |
| 6,814,383 B2 | 11/2004 | Reed, III et al. | |
| 6,863,328 B2 * | 3/2005 | Kiester et al. | 296/37.6 |
| 6,871,895 B2 * | 3/2005 | Kiester et al. | 296/26.09 |

(Continued)

FOREIGN PATENT DOCUMENTS

| | | |
|---|---|---|
| CA | 2435734 | 1/2005 |
| CA | 2461503 | 10/2008 |
| WO | WO2004020909 | 3/2004 |

*Primary Examiner* — Jorge Pereiro
(74) *Attorney, Agent, or Firm* — Michael Kroll

(57) ABSTRACT

A tailgate barbeque grill for use in the bed of a pickup truck. The grill slides along rails and is stored in the front portion thereof for transport and is positioned in the rear portion and lowered for use.

13 Claims, 9 Drawing Sheets

(56) References Cited

U.S. PATENT DOCUMENTS

| | | | |
|---|---|---|---|
| 6,921,120 B1 * | 7/2005 | Ervin | 296/26.02 |
| 6,945,580 B1 * | 9/2005 | Hentes | 296/37.6 |
| 6,976,820 B2 * | 12/2005 | Sandy | 414/557 |
| 7,033,128 B2 * | 4/2006 | Poindexter | 414/544 |
| 7,048,490 B2 * | 5/2006 | Henderson | 414/462 |
| 7,052,066 B2 | 5/2006 | Emery et al. | |
| 7,111,884 B2 * | 9/2006 | Johnson | 296/26.1 |
| 7,128,356 B2 * | 10/2006 | Bassett | 296/37.6 |
| 7,232,172 B2 * | 6/2007 | Kiester et al. | 296/39.2 |
| 7,530,618 B2 * | 5/2009 | Collins et al. | 296/37.6 |
| 8,057,152 B1 * | 11/2011 | White | 414/546 |
| 8,281,967 B2 * | 10/2012 | Evans | 224/404 |
| 2003/0227188 A1 * | 12/2003 | De Gaillard | 296/50 |
| 2004/0018076 A1 * | 1/2004 | Poindexter | 414/477 |
| 2004/0131455 A1 * | 7/2004 | Henderson | 414/462 |
| 2004/0207226 A1 * | 10/2004 | Johnson | 296/50 |
| 2005/0073167 A1 * | 4/2005 | De Gaillard | 296/76 |
| 2006/0016447 A1 | 1/2006 | Meyer | |
| 2006/0086353 A1 | 4/2006 | Ransford | |
| 2006/0102669 A1 * | 5/2006 | Fouts et al. | 224/404 |
| 2006/0197352 A1 * | 9/2006 | Bassett | 296/37.6 |
| 2006/0226189 A1 * | 10/2006 | Lussier | 224/404 |
| 2006/0284437 A1 * | 12/2006 | Collins et al. | 296/37.6 |
| 2007/0006867 A1 * | 1/2007 | Karney et al. | 126/37 B |
| 2009/0071991 A1 * | 3/2009 | Evans | 224/402 |

* cited by examiner

TAILGATE BARBEQUE GRILL

BACKGROUND OF THE INVENTION

1. Field of the Invention

The present invention relates generally to barbeque grills and, more specifically to a tailgate grill installed within the bed of a pickup truck. The tailgate grill is positioned in the front of the truck bed for transport and storage and slides along rails to the rear of the truck bed where a cantilevered shelf supported by rail articulated sections lowers the tailgate grill to an appropriate level for use.

2. Description of the Prior Art

There are other Grill device designed for portability. Typical of these is U.S. Pat. No. 2,867,471 issued to Coon on Jan. 6, 1959.

Another patent was issued to Runyan on Sep. 7, 1982 as U.S. Pat. No. 4,347,830. Yet another U.S. Pat. No. 4,518,189 was issued to Belt on May 21, 1985 and still yet another was issued on Jun. 16, 1987 to Curry as U.S. Pat. No. 4,672,944.

Another patent was issued to McNulty on May 6, 1987 as U.S. Pat. No. 5,626,126. Yet another U.S. Pat. No. 5,640,949 was issued to Smith on Jun. 24, 1987. Another was issued to Davis on Mar. 12, 2002 as U.S. Pat. No. 6,354,286 and still yet another was issued on Oct. 8, 2002 to Lance, et al as U.S. Pat. No. 6,460,744.

Another patent was issued to Brennan on Jun. 10, 2003 as U.S. Pat. No. 6,575,155. Yet another U.S. Pat. No. 6,814,383 was issued to Reed, III, et al. on Nov. 9, 2004. Another was issued to Emery, et al. on May 30, 2006 as U.S. Pat. No. 7,052,066 and still yet another was issued on Jan. 26, 2006 to Meyer as U.S. Patent Application No. 2006/0016447.

Another patent was issued to Ransford on Apr. 27, 2006 as U.S. Patent Application No. 2006/0086353. Yet another International Patent Application No. WO 2004/020909 was issued to Mckoski on Mar. 11, 2004. Another was issued to Wheeler on Jan. 22, 2005 as Canadian Patent No. CA2435734 and still yet another was issued on Oct. 7, 2008 to Flannery as Canadian Patent No. CA2461503.

A camping apparatus adapted for installation in a station wagon, comprising: a frame structure having side walls, each of said side walls including a fixed panel, a removable panel, and separable connecting means for securing said removable panels in place, said panels being complementary, said frame structure also including transverse members defining with said side panels a drawer receiving cavity; an inner drawer unit; an outer drawer unit; separable connecting means for joining said drawer units in coplanar tandem relation for sliding movement into and out of the cavity formed by said frame structure; and a panel hinged to the outer end of the outer drawer unit and arranged to occupy a horizontal position thereby to form a work surface when said drawer units are partially withdrawn from said frame structure.

An outdoor cooking apparatus having a collapsible support which is pivotally mounted in the recess of an automotive spare tire rim. The pan of the cooking apparatus is pivotally attached to the end of the support and the pan and the recess form an enclosure for containing the collapsible cantilevered support when the support is collapsed and pivoted about its pivotal mounting and the pan is pivoted about its pivotal attachment to the support. When the support is collapsed and the pan pivoted, the pan's peripheral edge abuts the spare tire rim flange enclosing the support and any attachments on the support between the pan and the spare tire rim. The spare tire rim could, in one embodiment, be replaced by a portable housing having a carrying handle attached to it.

A cooking apparatus has a pivotal mounting unit attached to the bed of a pickup truck for supporting a cooking unit thereon. The pivotal mounting unit comprises a vertically extending pivotal support member which supports a pair of horizontally extending parallel rods or tubes which extend into and support a cooking unit slidably mounted thereon. The rods or tubes extend nearly the entire length of the cooking unit and support the cooking unit in a variety of positions.

A portable charcoal-heated cooking system for mounting to the coaming of a pick-up truck bed has a steam chamber and a grill chamber, each partly defined by a multiple flat-plate-reflection housing structure that in the grill chamber evens-out radiant heating between the grill edges and central portion. The housing structure also reduces volume necessary for a given cooking requirement. Rain shedding and liquid drainage provisions keep the system ready for use.

The apparatus is multifunctional in that it can be transported, readily and safely, from place to place by means of a vehicle. The transportable barbecue apparatus is detachably attachable to a land vehicle having connection means at the rear thereof, such as a receiver hitch on the rear bumper. The apparatus comprises a barbecue cooker and an support arm, most preferably an articulated support arm, having an inner end portion whereby the arm can be detachably secured at its inner end portion to the connection means so that the apparatus is held above ground level at the rear of the vehicle. Preferably, when the arm is detachably secured in this manner, the arm projects rearwardly from the vehicle in a plane that is substantially perpendicular to the rear bumper. The apparatus, supported by the arm, can be utilized with a stand whereby it becomes a stand alone barbecue cooker.

A portable barbecue grill assembly can be readily attached to the trailer receiver hitch of a motor vehicle and cantilevered therefrom to allow the assembly to be taken freely anywhere. The apparatus includes a principal support arm projecting horizontally outwardly from the rear of the vehicle and an upturned portion, to which an ash saucer is attached, and bolts therethrough anchor a kettle-type barbecue grill having a removable dome-shaped cover. Two food preparation and serving tables are attached to table supporting arms connected to the principal supporting arm below the ash saucer. The table tops, table supporting arms, and ash saucer are readily attachable and detachable by means of snap fastener pins.

A barbeque grill attachment assembly adapted and structured to secure a barbeque grill to the rear of a vehicle so that the grill may be used without detachment from the vehicle is disclosed. The grill assembly permits the barbeque grill to swing in a horizontal arc from its operational position farthest from the rear of the vehicle to a stowed position adjacent the rear of the vehicle.

A storage unit adapted to be slidably coupled to a rear floor portion of a vehicle, such as a pickup truck, may be provided with a mounting structure and a cabinet slidably coupled to the mounting structure. The storage unit may be provided with a plurality of drawers disposed in the cabinet and positioned within the cabinet between a pair of cabinet sidewalls, each of the drawers being movable in a direction parallel to the width of the cabinet. The storage unit may have a cover operatively connected to the cabinet, the cover being movable between an open position in which the drawers may be opened and a closed position in which the cover prevents the drawers from being opened, and a cover latch associated with the cover that allows the cover to be latched in its closed position.

A raisable and lowerable platform that houses a removable charcoal or gas grill and a removable cooler chest, with a storage compartment between the two, a telescoping flagpole mounted to the platform to display team colors, and a fold down table attached on both ends of the platform to provide more cooking area. In the preferred embodiment to date the platform is connected to a wheeled scissors lift system that is used to raise and lower the platform. The apparatus is carried and transported via a rollered receiver hitch assembly that is an integral part of the scissors lift system and that is conventionally mountable on a transport vehicle.

A vehicular tailgating system typically for mounting in or to a rear hatchback portion of a passenger-type vehicle is selectively interconnectable to a power source. In one aspect, the system described herein has a housing defining several temperature-specific chambers therein which are adapted to receive one of several interchangeable modules to provide a wide range of functionality to the system.

An improved vehicle mounted storage unit and workbench, comprising a variably configured cabinet, upper lid with workbench surface, mechanisms for varying the cabinet's working height, slides and wheels for moving the cabinet, mounting brackets to fix the unit to a floor portion of a vehicle. The slides allow the cabinet to slide in and out of the mounting brackets, and contain a quick release feature allowing the unit to be dismounted from them and the vehicle without using tools.

Disclosed is an outdoor cooking apparatus including a grill having a lower portion and an upper portion. The upper portion of the grill has a metal curved top surface, and is hinged to the lower portion of the grill. The lower portion of the grill is releasably mounted to a support frame, which is in turn releasably mounted to the rearward portion of a vehicle. A metal cover, which contains printed indicia thereon, releasably mounts to the upper portion of the grill. The printed indicia cover overlies the top surface of the upper portion of the grill, and is substantially parallel to the top surface of the upper portion of the grill.

A barbecue grill mount (10) for use with a vehicle (12) includes a hitch tube (20) received by a vehicle hitch receiver tube (16), an elongated support tube (32) that extends laterally from the hitch tube (20), a pivot tube (38) mounted by an outer end (46) of the support tube (32), an inverted L-shaped positioning tube (46) supported for rotational positioning by the pivot tube (38), and a grill tray (60) mounted on a horizontal portion distal end (58) of the positioning tube and adjustably positioned about the pivot tube under a control of a rotational positioner (44) of the pivot tube.

The present invention provides an apparatus for connecting a grill (11) or other object to the body of a vehicle (5) and transporting the grill (11) or other object to a remote location. Specifically, the present invention provide for an apparatus to support an object on a vehicle hitch (4). The apparatus is comprised of an elbow support component (30) and a transportation bar (20). The horizontal portion (31) of the elbow support component (30) detachably connects to the vehicle hitch (4), and the vertical portion (32) of the elbow support component (30) detachably connects to the transportation bar (20). The transportation bar (20) is comprised of a vertical sleeve (21) for detachably connecting to the elbow support component (30); a horizontal beam (22) for detachably connecting to the object; and at least one stability wing (23a, 23b) connecting the sleeve and the beam. By providing this extra support, the transportation bar (20) of the present invention provides for increased stability to the object during transportation.

A barbeque stand is taught for attachment to the rear of a vehicle, wherein the barbeque stand comprises: a horizontal support unit including an elongate, generally flat, rectangular, horizontal support member; and means disposed between the horizontal support member and the rear of the vehicle for varying the angular orientation of the horizontal support member relative to the rear of the vehicle.

An apparatus for mounting a grill to a vehicle bumper is provided. The apparatus for mounting a grill to a vehicle bumper includes a support platform, a support arm attached to the support platform at an end thereof, a pivot mount assembly for attaching an end of the support arm to a vehicle bumper, and a retaining mount assembly. A grill is fixedly mounted to the support platform by securing the grill to grill mounting flanges, which are attached to the support platform. The support arm is pivotal about the pivot mount assembly allowing the grill to be rotated about the vehicle for positioning of the grill for use. In addition, the grill support platform can be pivotal about the support arm allowing greater versatility in positioning the grill for use. The retaining mount assembly is attached to the vehicle bumper at a spaced distance from the pivot mount assembly and functions to retain the support arm in a non-use position against or parallel to the vehicle bumper.

While these grills may be suitable for the purposes for which they were designed, they would not be as suitable for the purposes of the present invention, as hereinafter described.

SUMMARY OF THE PRESENT INVENTION

A primary object of the present invention is to provide a portable tailgate barbeque grill installed in the bed of a pickup truck.

Another object of the present invention is to provide an apparatus for a tailgate barbeque grill that slides along rails between the front and the rear portions of the bed.

Yet another object of the present invention is to provide tailgate barbeque grill wherein said rails include a lock catch to prevent movement of the grill during transport and storage.

Still yet another object of the present invention is to provide a tailgate barbeque grill wherein said rails are anchored to the bed by bolts for permanent installation or pegs that fit into mounting holes for removable installation.

Another object of the present invention is to provide a tailgate barbeque grill wherein gas is delivered to the grill from a main gas line leading from a propane tank.

Yet another object of the present invention is to provide a tailgate barbeque grill wherein gas is distributed to burners according to the settings of the burner controls.

Still another object of the present invention is to provide a hitch mount for suspending the grill from a vehicle with a trailer hitch.

Additional objects of the present invention will appear as the description proceeds.

The present invention overcomes the shortcomings of the prior art by providing a tailgate barbeque grill for use in the bed of a pickup truck. The grill slides along rails and is stored in the front portion thereof for transport and is positioned in the rear portion for use The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
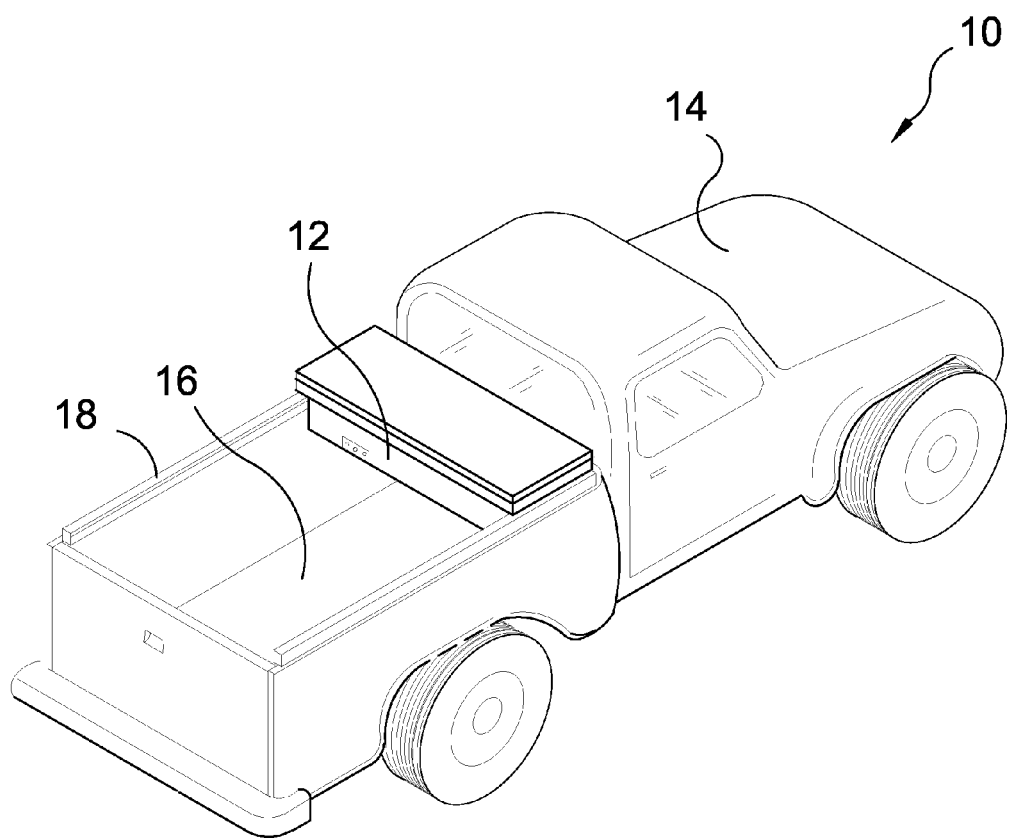
FIG. 1 is a perspective view of the present invention.

Turning now descriptively to the drawings, in which similar reference characters denote similar elements throughout the several views, the figures illustrate the Apparatus for a Slidable Barbeque Grill for a Pick-Up Truck of the present invention. With regard to the reference numerals used, the following numbering is used throughout the various drawing figures.

10 Apparatus for a Slidable Barbeque Grill for a Pick-Up Truck
    12 tailgate barbeque grill
    14 pick-up truck
    16 bed of 14
    18 rail assembly
    20 articulated rail section
    22 tension cable
    24 lid of 12
    26 latch
    28 latch recess
    30 latch release button
    32 control panel
    34 burner control
    36 ignition switch
    38 lowering linkage
    40 linkage arm
    42 pulley
    44 traveling base
    46 tether
    48 tension spring
    50 propane tank
    52 main gas line
    54 burner gas line
    56 burner The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE DRAWING FIGURES

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a perspective view of the present invention 10. Shown is the tailgate grill 12 of the present invention 10 installed within the bed 16 of a pickup truck 14. The tailgate grill 12 is positioned in the front of the truck bed 16 for transport and storage and slides along rail assemblies 18 to the rear of the truck bed 16 where a cantilevered shelf supported by rail articulated sections lowers the tailgate grill 12 to an appropriate level for use.

Figure 2:
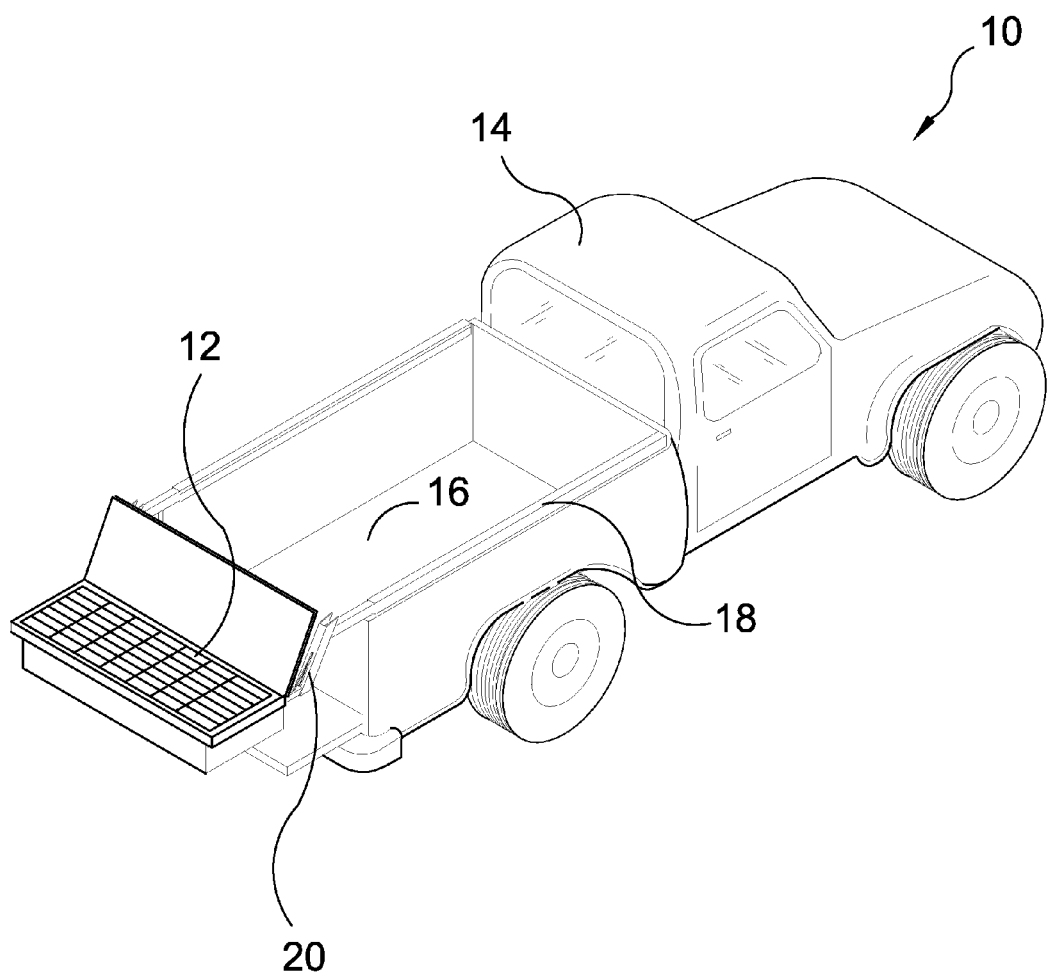
FIG. 2 is a perspective view of the tailgate grill of the present invention.

FIG. 2 is a perspective view of the tailgate grill 12 of the present invention 10. Shown is the tailgate grill 12 moved via rail assemblies 18 to the rear of the bed 16 of the pick-up truck 14 whereupon articulated linkage rail sections 20 lower the tailgate grill 12 to a predetermined height.

Figure 3:
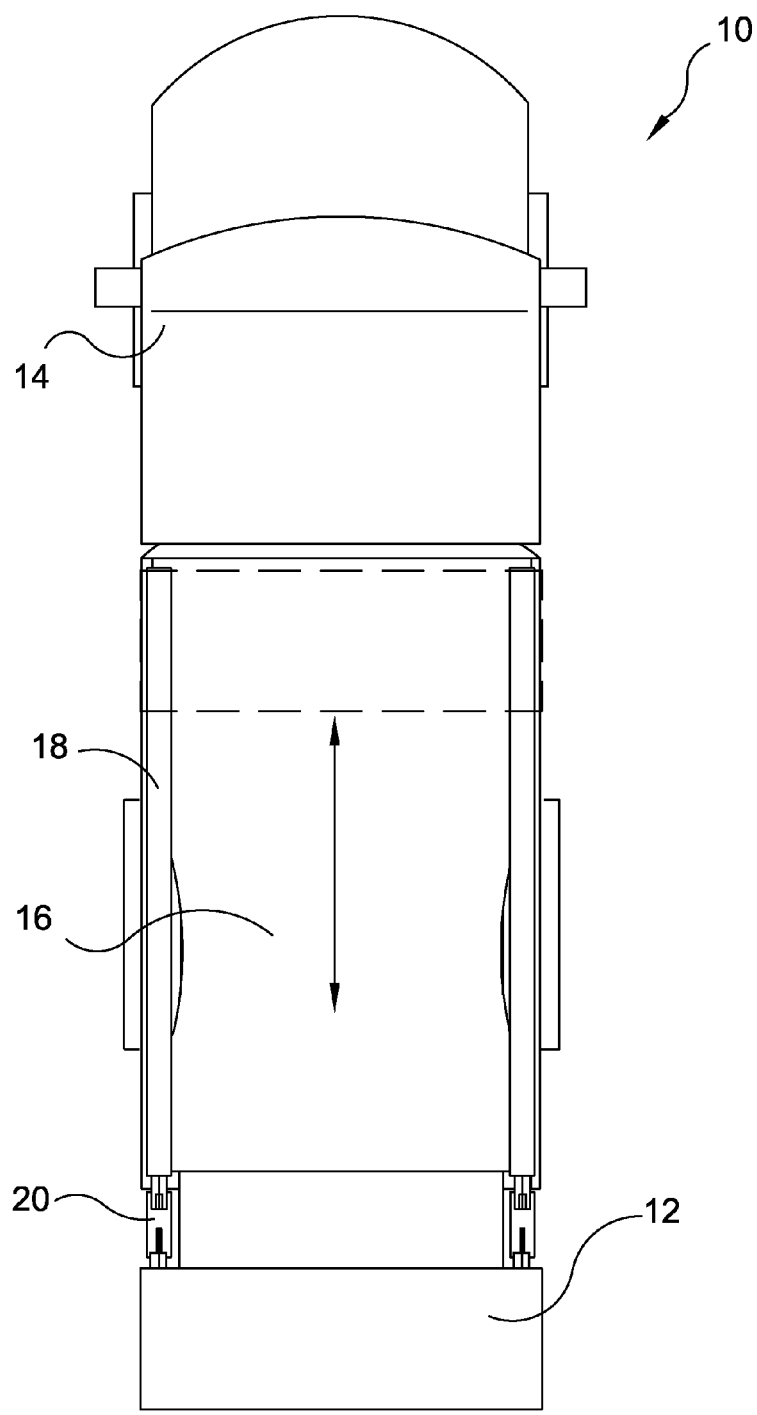
FIG. 3 is a top view of the tailgate grille of the present invention.

FIG. 3 is a top view of the tailgate grill 12 of the present invention 10. Shown is an illustration depicting the tailgate grill 12 movable between a stored position to an operative position. The operative position moves the grill 12 on rail assemblies 18 to the end of the bed 16 of the pick-up truck 14 where tensioned tethers and articulated linkage sections 20 lowers the grille to a predetermined height.

Figure 4:
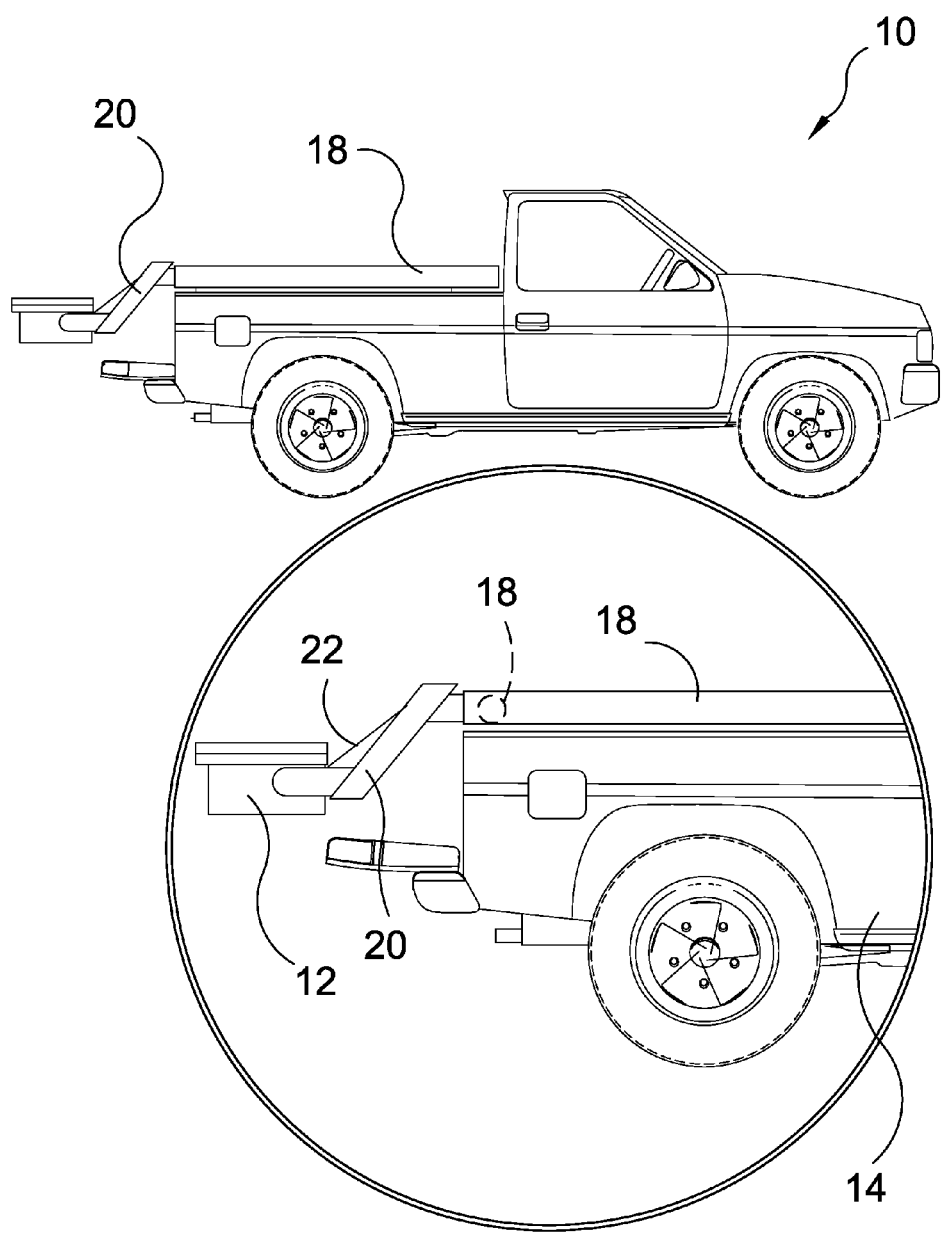
FIG. 4 is an enlarged side view of an operative tailgate grille.

FIG. 4 is an enlarged side view of an operative tailgate grill 12. Shown is the tailgate grill 12 of the present invention 10 installed within the bed of a pickup truck 14. The tailgate grill 12 is positioned in the front of the truck bed for transport and storage and slides along top surface mounted rail assemblies 18 wherein the grill 12 moves on rollers 58 to the rear of the truck bed where a cantilevered shelf supported by rail articulated linkage sections 20 and tensioned cables 22 lowers the tailgate grill 12 to an appropriate level for use.

Figure 5:
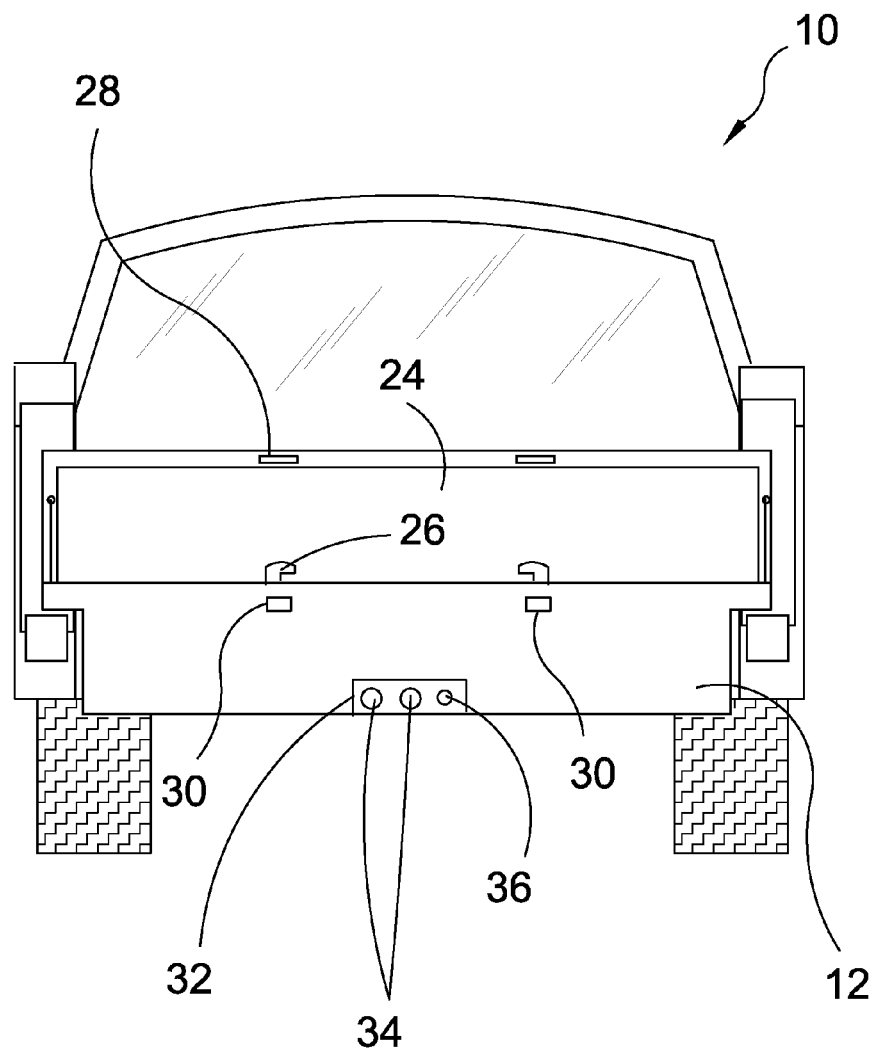
FIG. 5 is a front view of the tailgate grille in the operative position.

FIG. 5 is a front view of the tailgate grill 12 of the present invention 10 in the operative position. Shown is the tailgate grill 12 with the lid 24 open. The grill 12 has latches 26 and mating latch recesses 28 for maintaining the lid 24 in the closed position during transport and storage. Latch release buttons 30 are provided to open the lid 24 for use. A control panel 32 has burner controls 34 and an ignition switch 36.

Figure 6:
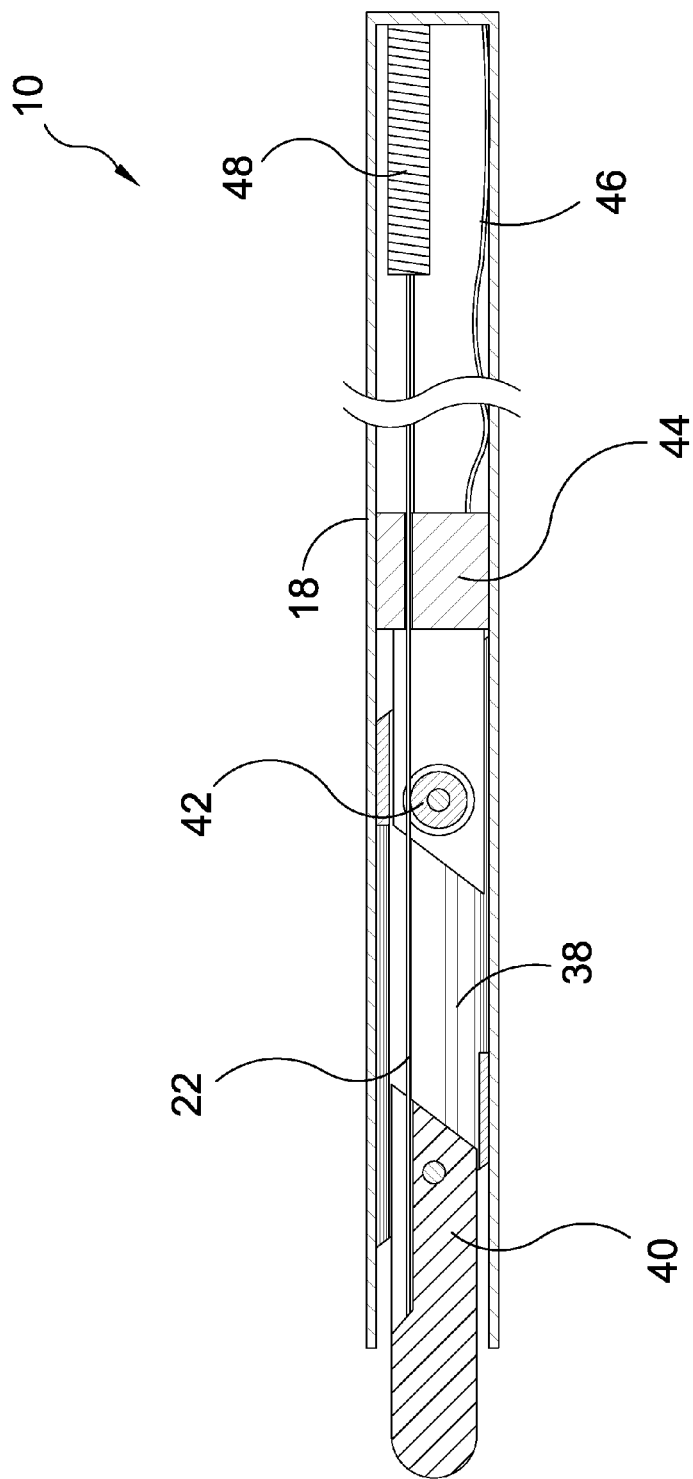
FIG. 6 is a sectional view of a grill transport rail of the present invention.

FIG. 6 is a sectional view of a grill transport rail 18 of the present invention 10. Shown is a sectional view of the rail assembly 18 having a cantilevered grill support with articulated rail sections 20 comprising a lowering linkage 38 and linkage arm 40, tension cable 22, pulley 42, traveling base 44, tether 46 and tension spring 48 for assisting in the lowering and raising the tailgate grill from a lower operative position to a raised stored position.

Figure 7:
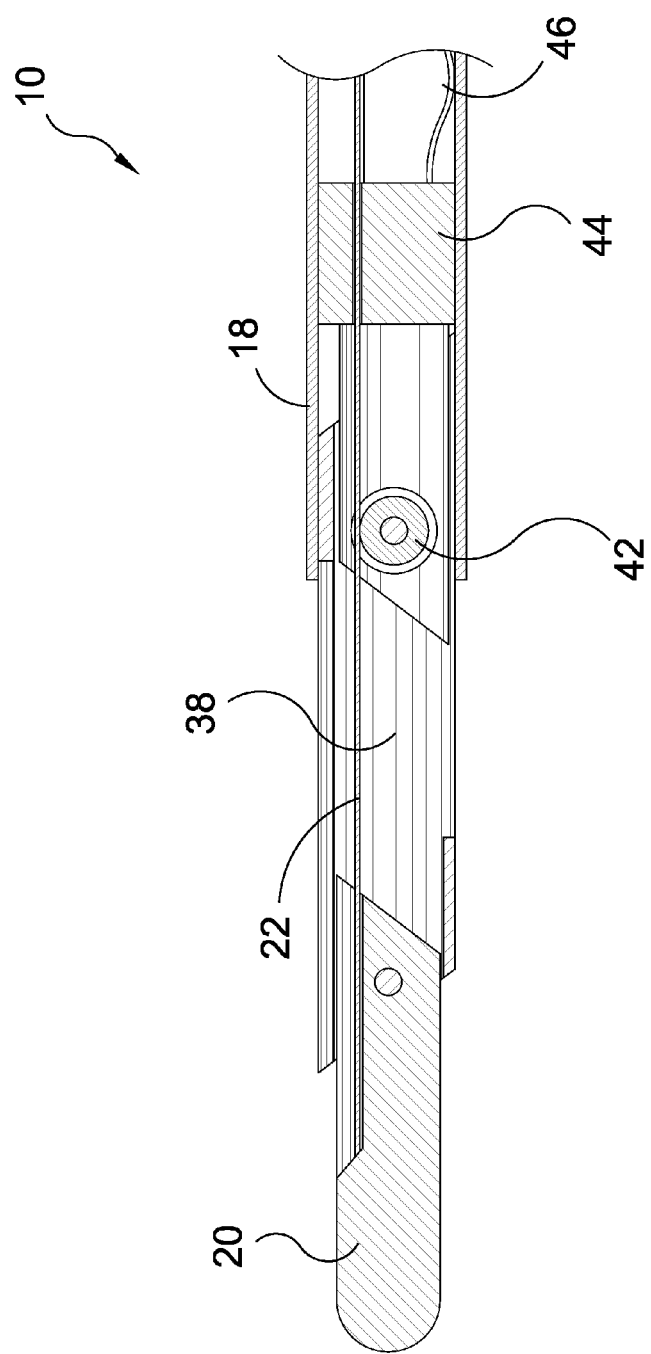
FIG. 7 is a sectional view of a grill transport rail moving to an operative position.

FIG. 7 is a sectional view of a grill transport rail of the present invention 10 moving to an operative position. Shown is a sectional view of the rail assembly 18 having a cantilevered grill support with articulated rail sections 20 comprising a lowering linkage 38 and linkage arm 40, tension cable 22, pulley 42, traveling base 44, and tether 46 for assisting in the lowering and raising the tailgate grill from a lower operative position to a raised stored position.

Figure 8:
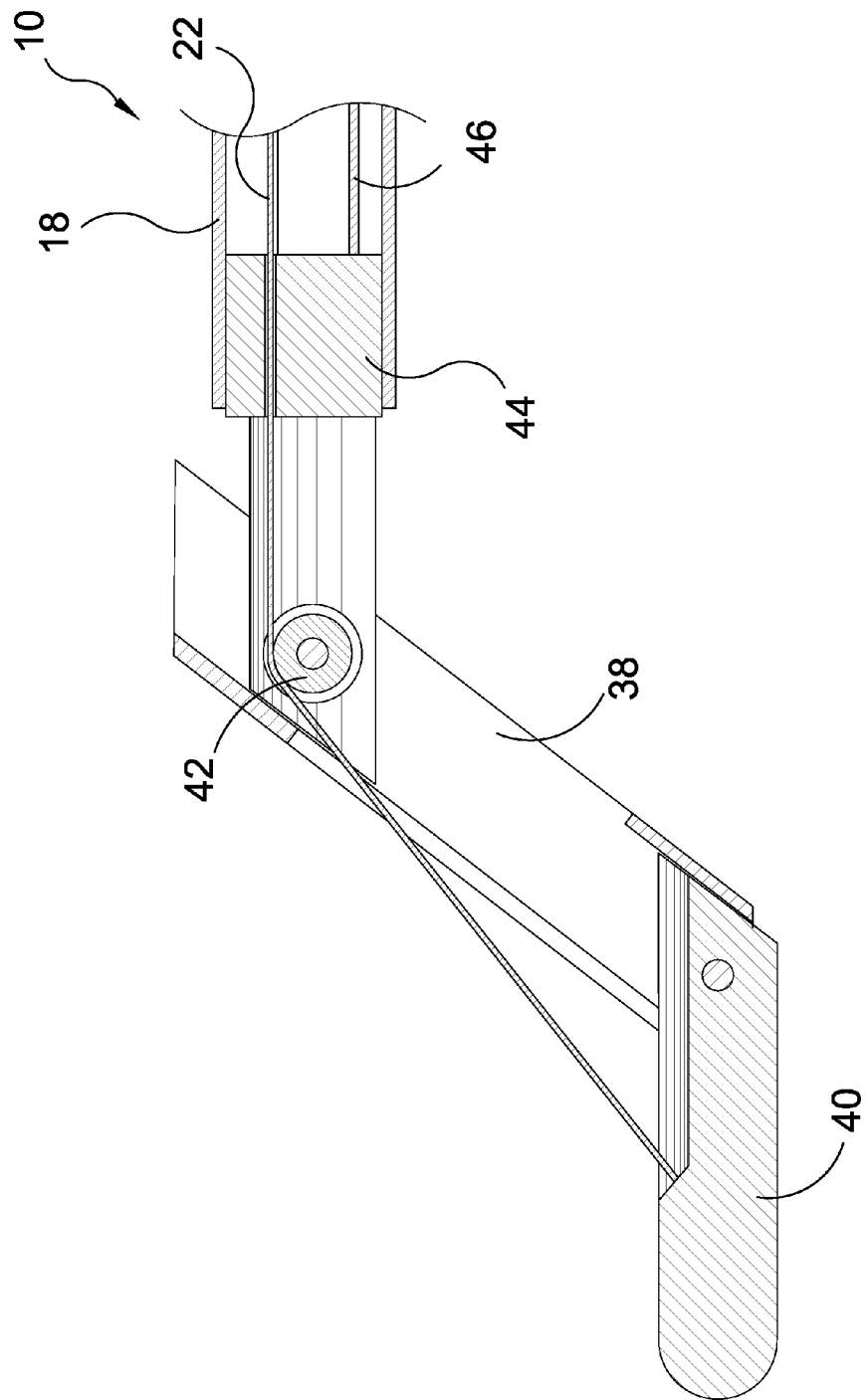
FIG. 8 is a sectional view of a grill transport rail in its operative position.

FIG. 8 is a sectional view of a grill transport rail in its 10 in its operative position. Shown is a sectional view of the rail assembly 18 having a cantilevered grill support with articulated rail sections 20 comprising a lowering linkage 38 and linkage arm 40, tension cable 22, pulley 42, traveling base 44, and tether 46 for assisting in the lowering and raising the tailgate grill from a lower operative position to a raised stored position.

Figure 9:
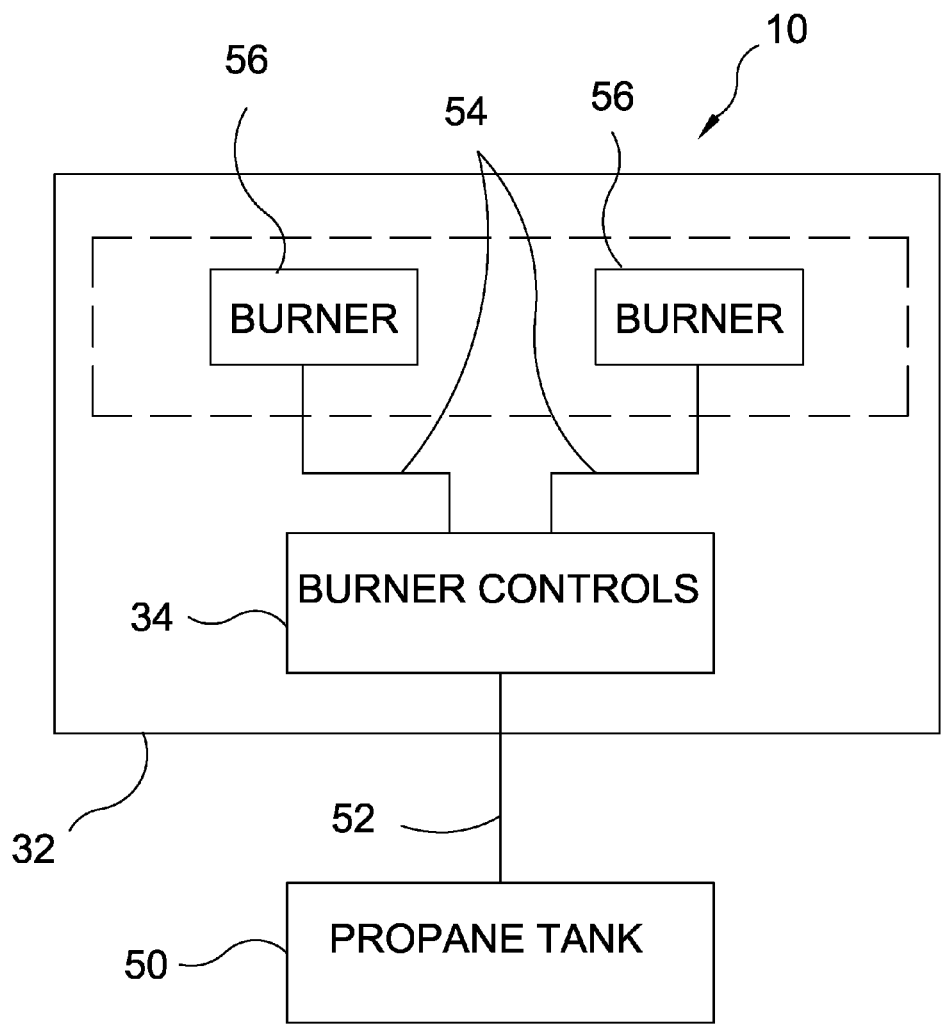
FIG. 9 is a block diagram of the gas assembly.

FIG. 9 is a block diagram of the gas assembly of the present invention 10. Shown is a block diagram of the gas line assembly wherein a main gas line 52 delivers gas from the propane tank 50 where the gas is distributed according to the burner controls 34 on the control panel 32 to burner gas lines 54 leading to the burners 56.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A slidable barbeque grill for installation in the bed of a pick-up truck comprising:
   a) a rail assembly installed along each top edge of side walls of the bed of a pick-up truck;
   b) a barbeque grill with rollers to slide within each said rail assembly, said grill movable along each said rail assembly between a storage position located at a forward end of said bed and an operative position to the rear of and spaced from said bed and above a tailgate of said bed in an open position; and
   c) an articulated linkage arm integrated with each said rail assembly folding for lowering said grill to an appropriate height for usage, said articulated linkage arm unfolding to ride in said rail assembly to said storage position of said grill.

2. The slidable barbeque grill for installation in the bed of a pick-up truck according to claim 1, wherein each said rail assembly further comprises a tension cable to support said grill when in position for usage.

3. The slidable barbeque grill for installation in the bed of a pick-up truck according to claim 2, wherein each said rail assembly further comprises a pulley for guiding said tension cable to a lowered position of said grill for usage.

4. The slidable barbeque grill for installation in the bed of a pick-up truck according to claim 3, wherein each said rail assembly includes a tension spring to increase the ease of moving said barbeque grill back and forth.

5. The slidable barbeque grill for installation in the bed of a pick-up truck according to claim 4, wherein each said rail assembly further includes a traveling base, said grill abutting said travelling base in said storage position and spaced from said base when in said operating position.

6. The slidable barbeque grill for installation in the bed of a pick-up truck according to claim 5, wherein each said rail assembly further comprises a tether.

7. The slidable barbeque grill for installation in the bed of a pick-up truck according to claim 6, wherein said articulated arm of each said rail assembly includes a pivotally connected lowering linkage.

8. The slidable barbeque grill for installation in the bed of a pick-up truck according to claim 7, wherein each said rail assembly further comprises a linkage arm for maintaining said grill in a substantially horizontal position when lowered for usage.

9. The slidable barbeque grill for installation in the bed of a pick-up truck according to claim 8, wherein said barbeque grill includes a control panel comprising burner controls and an ignition switch.

10. The slidable barbeque grill for installation in the bed of a pick-up truck according to claim 9, wherein said barbeque grill further includes a propane tank with a main gas line leading to said burner controls.

11. The slidable barbeque grill for installation in the bed of a pick-up truck according to claim 10, wherein said burner controls have regulated gas lines leading to their respective burners.

12. A slidable barbeque grill for installation in the bed of a pick-up truck comprising:
   a) a pair of opposing rail assemblies installed on the upper portions of the interior sidewalls of the bed of a pick-up truck;
   b) a barbeque grill having rollers to slide along said rail assemblies on said bed of said pick-up truck between a storage position in a forward end of said bed and a deployed position spaced from a rear end of said bed and above a tail gate of said bed in an open position;
   c) an articulating arm for lowering said barbeque grill to an appropriate height for use; and
   d) wherein each rail assembly further comprises:
      i. a traveling base residing within each said rail assembly;
      ii. a tether;
      iii. a tension cable to support said barbeque grill when in a lowered position;
      iv. a pulley to guide said tension cable; and
      v. a tension spring to ease the movement of said barbeque grill along each rail assembly, whereby said grill is spaced from said travelling base when deployed and abutting against said travelling base when in the storage position.

13. The slidable barbeque grill for installation in the bed of a pick-up truck according to claim 12, wherein said barbeque grill further includes:
   a) a propane tank;
   b) a control panel;
   c) a main gas line communicating between said propane tank and said control panel;
   d) an ignition switch; and
   e) burner gas lines leading from said control panel to their respective burners.

* * * * *